(12) United States Patent
Akyol et al.

(10) Patent No.: US 10,465,760 B2
(45) Date of Patent: Nov. 5, 2019

(54) STOP ARRANGEMENT AND BRAKING DEVICE HAVING SUCH AN ARRANGEMENT

(71) Applicant: PINTSCH BUBENZER GmbH, Kirchen-Wehbach (DE)

(72) Inventors: Azad Akyol, Wissen (DE); Cristoph Pramstaller, Nauroth (DE); Johannes Hammelrath, Bonn (DE)

(73) Assignee: Pintsch Bubenzer GmbH, Kirchen-Wehbach (DE)

( * ) Notice: Subject to any disclaimer, the term of this patent is extended or adjusted under 35 U.S.C. 154(b) by 18 days.

(21) Appl. No.: 15/105,336

(22) PCT Filed: Dec. 9, 2014

(86) PCT No.: PCT/EP2014/077021
§ 371 (c)(1),
(2) Date: Jun. 16, 2016

(87) PCT Pub. No.: WO2015/091102
PCT Pub. Date: Jun. 25, 2015

(65) Prior Publication Data
US 2017/0016499 A1    Jan. 19, 2017

(30) Foreign Application Priority Data
Dec. 19, 2013   (DE) .................. 10 2013 114 525

(51) Int. Cl.
*F16D 65/40*   (2006.01)
*F16D 49/16*   (2006.01)
(Continued)

(52) U.S. Cl.
CPC ............. *F16D 65/40* (2013.01); *F16D 49/16* (2013.01); *F16D 55/2245* (2013.01); *F16D 65/0068* (2013.01)

(58) Field of Classification Search
CPC .. F16D 65/18; F16D 2125/64; F16D 55/2245; F16D 65/52; F16D 55/2262
(Continued)

(56) References Cited

U.S. PATENT DOCUMENTS 3,129,790 A  *  4/1964  Davis .................. F16D 55/2245
                                                        188/152
3,220,513 A  * 11/1965  Hodkinson ......... F16D 55/2245
                                                        188/73.33
(Continued)

FOREIGN PATENT DOCUMENTS

DE       14 75 307 B1      4/1971
DE       3542937 A1  *     6/1987  ............... B61H 5/00
(Continued)

OTHER PUBLICATIONS

International Search Report and Written Opinion dated Jul. 17, 2015 for Application No. PCT/EP2014/077021, 14 pgs.
(Continued)

*Primary Examiner* — Bradley T King
*Assistant Examiner* — Mahbubur Rashid
(74) *Attorney, Agent, or Firm* — Frost Brown Todd LLC (57) ABSTRACT

A stop arrangement having a first brake lever arrangement and a second brake lever arrangement, which together form a brake lever pair of a brake caliper arrangement and which, at the first end thereof, are respectively articulated on a support and, at the second end thereof, are coupled to one another by means of a positioning arrangement, wherein a first stop element is arranged in each case between the ends of the first brake lever arrangement and a second stop element is arranged between the ends of the second brake lever arrangement, and first and second stop elements are formed and mesh in such a way that they allow operating movements in opposite direction towards and away from
(Continued)

one another between a brake position and a releasing position of the brake lever arrangements and inhibit an aligned tilting movement of the brake lever arrangements in a tilting direction (M), such that the brake lever arrangements are retained in the releasing position against a tilting action in a centering position within a defined centering position range with respect to a brake element.

20 Claims, 5 Drawing Sheets

(51) Int. Cl.
*F16D 55/224* (2006.01)
*F16D 65/00* (2006.01)
(58) Field of Classification Search
USPC ........................................................ 188/71.8
See application file for complete search history.

(56) References Cited

U.S. PATENT DOCUMENTS

| | | | | |
|---|---|---|---|---|
| 3,253,681 A * | 5/1966 | Butler | ....................... | B61H 5/00 188/72.9 |
| 3,356,190 A | 12/1967 | Prussak | | |
| 3,968,864 A * | 7/1976 | Deichsel | ................... | B66D 5/14 188/170 |
| 4,066,152 A * | 1/1978 | Pascal | ................. | F16D 55/2245 188/171 |
| 4,473,136 A * | 9/1984 | Emilsson | ................. | B61H 5/00 188/59 |
| 4,497,392 A * | 2/1985 | Stensson | ................. | B61H 5/00 188/59 |
| 5,501,305 A * | 3/1996 | Stalmeir | ............. | F16D 55/2245 188/153 R |
| 5,660,250 A * | 8/1997 | Treude | ................ | F16D 55/2245 188/72.9 |
| 5,739,610 A * | 4/1998 | Nemoto | .............. | F16D 55/2245 188/158 |
| 5,782,321 A * | 7/1998 | Treude | ................ | F16D 55/2245 188/196 B |
| 5,813,499 A * | 9/1998 | Staltmeir | ................. | B61H 5/00 188/59 |
| 6,109,397 A * | 8/2000 | Chen | ......................... | B62L 1/14 188/24.12 |
| 6,112,861 A * | 9/2000 | Tomoe | ................ | F16D 55/2245 188/196 B |
| 6,991,072 B2 * | 1/2006 | Bonfils | ................... | B64C 27/12 188/72.6 |
| 2008/0087505 A1 * | 4/2008 | Kobelt | ................ | F16D 55/2245 188/72.7 |
| 2012/0222921 A1 * | 9/2012 | Nago | ....................... | B62L 1/16 188/24.21 |

FOREIGN PATENT DOCUMENTS

| | | | | |
|---|---|---|---|---|
| DE | 196 09 764 A1 | 12/1996 | | |
| DE | 197 35 127 C1 | 3/1999 | | |
| DE | 20 2006 007823 U1 | 9/2007 | | |
| EP | 0342580 A1 * | 11/1989 | ............... | B61H 5/00 |
| EP | 0431382 A2 * | 6/1991 | ............... | B61H 5/00 |
| EP | 0575720 A1 * | 12/1993 | ................ | B62L 1/16 |
| EP | 0731286 A1 * | 9/1996 | ............... | B61H 5/00 |
| EP | 2 037 146 A2 | 3/2009 | | |
| FR | 2982922 A1 * | 5/2013 | ......... | F16D 55/2245 |
| JP | S59-007924 U1 | 1/1984 | | |
| JP | H01-113632 U1 | 7/1989 | | |
| JP | 2007040354 A * | 2/2007 | | |
| KR | 101006061 B1 * | 1/2011 | ......... | F16D 55/2245 |
| WO | WO-2010015933 A1 * | 2/2010 | ......... | F16D 55/2245 |
| WO | WO 2015/091102 A2 | 6/2015 | | |

OTHER PUBLICATIONS

International Preliminary Report on Patentability dated Jun. 21, 2016 for Application No. PCT/EP2014/077021, 10 pgs.
German Office Action dated Jul. 31, 2014 for Application No. 10 2013 114 525.6, 8 pgs.
Australian Office Action, Examination report No. 1 for standard patent application, dated Jun. 23, 2017 for Application No. AU 2014365240, 2 pgs.
Australian Office Action, Notice of acceptance for patent application, dated Nov. 7, 2017 for Application No. AU 2014365240, 3 pgs.
Japanese Office Action, Notice of Reasons for Rejection, dated Mar. 21, 2017 for Application No. JP 2016-536964, 5 pgs.
Japanese Office Action, Decision to Grant a Patent, dated Aug. 29, 2017 for Application No. JP 2016-536964, 6 pgs.

* cited by examiner

STOP ARRANGEMENT AND BRAKING DEVICE HAVING SUCH AN ARRANGEMENT

FIELD OF THE INVENTION

The present invention relates to a stop arrangement having a first brake lever arrangement and a second brake lever arrangement, which together form a brake lever pair of a brake caliper arrangement and which, at the first end thereof, are respectively articulated on a support and, at the second end thereof, are coupled to one another by means of a positioning arrangement.

BACKGROUND OF THE INVENTION

Such brakes are widely used in industrial plants. They are usually made as disk or drum brakes. Here, two brake lever arrangements form a brake caliper which is provided with two brake shoes (brake pad or lining, brake pad or lining support), and the brake body (usually a disk or drum) to be slowed down runs between said brake shoes. In order to brake, the brake caliper and thus also the brake shoes are closed via a lever mechanism, the brake shoes exert a brake force on the brake body, and the rotary motion thereof is inhibited or stopped by the resulting frictional forces.

The basic set-up of such brakes is similar. In the case of an upright brake, the lower (first) end of each of the two brake levers is swivel-mounted at a distance relative to each other on a basic frame (support). At the upper (second) end thereof, they are coupled to one another via an adjusting lever, a rocker arm and an adjusting rod. The adjusting lever moves synchronously with the rocker arm and, at one end, is connected in articulated fashion to the upper end of a brake lever and, at the adjusting leg thereof, is articulated by a brake releasing device or a and a brake spring, which are also mounted in articulated fashion to the support at the opposing (lower) end thereof.

The rocker arm coupled to the adjusting lever is coupled in articulated fashion via a leg end to an end of the adjusting bar which, with the other end thereof, is articulated on the upper end of the other brake lever. In order to brake, the adjusting lever is pulled down via the brake releasing device and/or via the brake spring, the associated tilting movement of the rocker arm which engages the adjusting bar reduces the distance between the two ends of the brake lever and in so doing performs the caliper movement which joins the brake levers or brake pads, thus acting on the brake body.

In order to release the brake, the releasing device or the brake releasing device forces the adjusting lever leg upwards, thus pushing the two brake levers apart so as to conduct an opening/releasing brake lever caliper movement. The brake pads are removed from the brake body which is released.

During the operation, the brake pads and, to lesser degree, the brake bodies wear off. Without compensation, this will increase the braking distances which can change the response times and brake characteristics (brake force). In order to compensate for this wear, the adjusting rod is provided with a readjusting mechanism which via a stop-free run-spindle arrangement reduces the length of the adjusting rod in accordance with wear, as a result of which the braking distances remain approximately constant.

Another problem of these lever brakes is that tilting forces are applied by the adjusting elements (brake releasing device and brake spring) when the brake is released. As a result of said tilting forces, the two brake levers can swivel/tilt accordingly in one direction while a brake pad abuts and rubs against the brake body.

In order to solve this problem there are (readjustable) stops which take effect between a brake lever and a basic frame and shall prevent this tilting—i.e. center the released brake levers to the brake body. There are stops which are manually readjusted in accordance with wear from time to time or also those which have a readjusting mechanism that adjusts itself automatically in an updating fashion—i.e., adapts to the wear-related change in the brake lever position. Such stop mechanisms are known from DE 196 09 764 A1, for example. They use e.g. adjustment cranks and/or a linear free run that can be telescoped, all of which take effect between the brake levers and the support (frame). Such mechanisms are comparatively complex structure-wise and can require extensive maintenance.

Therefore, the object is to provide an improved and in particular also simplified centering mechanism which prevents tilting of the brake lever mechanism.

SUMMARY OF THE INVENTION

This object is achieved by the subject matter of claim 1 of the present invention.

The stop arrangement according to the invention comprises a first brake lever arrangement and a second brake lever arrangement, which together form a brake lever pair of a brake caliper arrangement and which, at the first end thereof, are respectively articulated on a support and, at the second end thereof, are coupled to one another by means of a positioning arrangement. In each case, a first stop element is here arranged between the ends of the first brake lever arrangement and a second stop element is disposed between the ends of the second brake lever arrangement. The first and second stop elements are designed and mesh with one another in such a way that they allow operating movements in opposite directions towards and away from one another between a brake position and a releasing position of the brake lever arrangements and inhibit an aligned tilting movement of the swiveling levers in a tilting direction, such that the brake lever pair is retained in the releasing position against a tilting action within a defined centering position range with respect to a brake body without a brake element contacting the brake body.

The invention also relates to a brake assembly having such a stop arrangement.

Further aspects and features of the present invention are specified in the dependent claims, the accompanying drawings and the following description of embodiments.

BRIEF DESCRIPTION OF THE DRAWINGS

Figure 1:
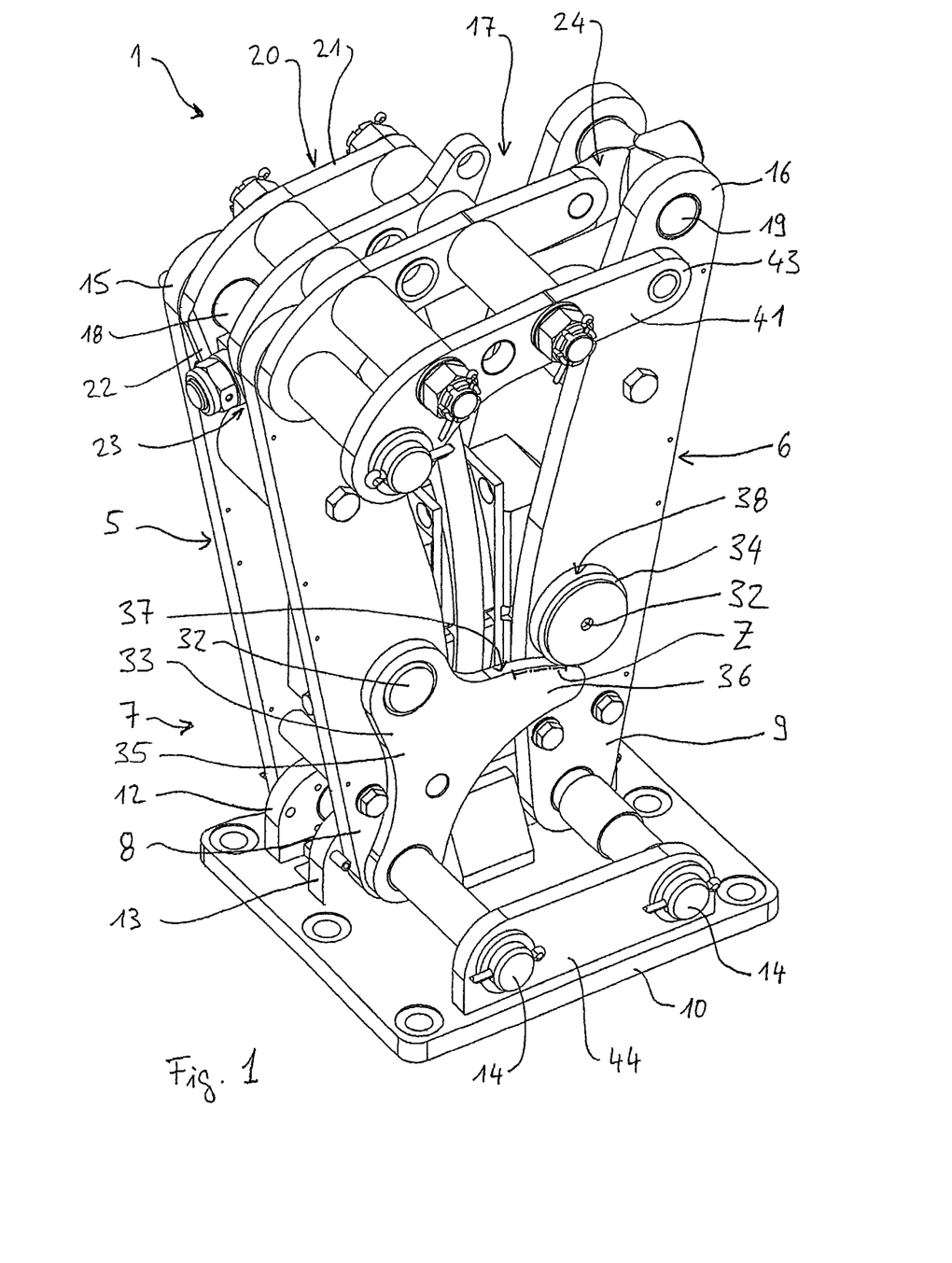
FIG. 1 shows a perspective view of a brake assembly obliquely from above, said brake assembly including a stop device according to the invention.

Embodiments of the invention are now described by way of example and with reference to the enclosed drawings, wherein:

FIG. 1 shows an exemplary embodiment of a stop arrangement according to the invention. General explanations on the embodiments are initially made, followed by a detailed description.

The stop arrangement according to the invention distinguishes itself by a first stop element and a second stop element, which are both arranged on the first and second brake lever arrangements. They are made and designed in such a way that they engage one another, thus allowing operative movements in opposite directions between a brake position and a releasing position of the brake lever arrangements and inhibiting an aligned tilting movement of both swiveling lever arrangements in one direction. In the releasing position, the brake lever pair is thus protected against a tilting action within a defined centering position range with respect to the brake body. There is no one-sided wear on one of the brake pads or on the brake body, which might otherwise occur due to an abutment of a brake pad on the brake body. An additional readjusting mechanism of the stop elements is not necessary since the latter inhibit the tilting movement in every operating position independently from the position of the brake levers to one another. An aligned tilting movement refers in this connection to an adjustment of the entire brake arrangement and in particular of the brake lever arrangements where they move simultaneously and/or accordingly in one direction.

Due to the asymmetric articulation of the brake lever arrangements via the positioning arrangement there is a preferred tilting direction in the case of substantially upright brake lever arrangements. The stop arrangement is made in such a way that the brake lever arrangements are retained counter to this preferred tilting direction. The brake lever arrangements are here held within a defined centering position range with respect to the brake body which is adjusted in such a way that the brake elements cannot contact the brake body in this region.

There are embodiments where this centering position range comprises a first limit position and a second wear-related limit position, which the brake lever arrangements adopt in the releasing position. In the first limit position, the brake lever arrangements are opened further. This first limit position concerns a state in which brake body and brake elements are largely fresh. In a second limit position, the brake lever arrangements are closed further, namely by the amount of the wear removal on the brake elements or on the brake body. The positions of the brake lever arrangements within the centering position range are adjusted via a wear readjustment which modifies the position of the brake lever arrangements relative to one another either as required or automatically during the braking operation.

In one embodiment, the first and second stop elements are respectively provided with a control curve contour, which abut against each other in a centering position within the centering position range (abut against one another in a self-locking fashion), as a result of which the tilting effect acting on the brake lever arrangement abuts the control curve contour of the first stop element on that of the second stop element so as to inhibit another tilting movement of the brake lever arrangements coupled in this way via the control curve contours of the stop elements.

In one embodiment, the first stop element is here formed as a control cam and the second stop element as a stop roller.

This embodiment allows for a simple control curve combination, in which one control curve is formed on the stop roller as a radial surface with constant radius and the other control curve surface has a control curve contour curvature course which is adapted thereto. During the braking operation when closing and releasing the brake, both surfaces remain at a constant distance to each other or slide or roll off each other whereas under tilting load in one direction the control cam with its control curve contour supports the stop roller and rests on the latter, thus inhibiting the tilting movement.

In one embodiment, the control cam is formed as a loop which is fixed, on the one hand, in the first articulation point of the brake lever arrangement and, on the other hand, in a reception point of a brake pad support between the first end and the second end of the brake lever arrangement. These points provide two highly stable journal or shaft ends which can be positioned with high accuracy and on which the loop serving as a control cam can be accurately positioned and fixed in conformity with load.

In another embodiment, the stop roller is merely fixed to the brake lever arrangement in the reception point of a brake pad support. Since the brake roller is made in point-symmetric fashion, it is sufficient to have a single fixation point for which the shaft ends that receive the brake elements and/or the brake pad supports in the brake lever arrangement are particularly suitable. Since the brake lever arrangements of the conventional designs are relatively close together in this region, compact and robust stop elements can be formed as a cam and roller or as two engaging cams.

In one embodiment, the curvature relationships between the radii of curvature formed on the first stop element in the control curve contour and the radii of curvature along the curvature course of the control curve contour of the second stop element have a ratio between three to one and one to one, and in particular of two to one. Thus, the effective surface pressures in the contact region of the two control curve contours can be adapted so as to avoid an overload of the stop elements. In this way, it is also simultaneously possible that e.g. one control curve contour has a fixed radius while the second control curve contour has a curvature course with changing radii of curvature to ensure the movability of the brake lever arrangement relative to one another in the braking and releasing operations.

There are also embodiments, in which the tilting of the swiveling lever arrangements shall be inhibited in both tilting directions. This is achieved in that a first stop element and a second stop element are arranged on each of the two brake lever arrangements—e.g. on the two opposing sides of the brake lever arrangements—which then engage in crosswise fashion so as to inhibit a tilting movement in both directions. This serves for suppressing, on the one hand, the function-related tilting effect which is applied via the releasing device and/or the brake spring and, on the other hand, a positional tilting effect which can occur due to gravity e.g. by a horizontal arrangement of the brake lever arrangements (e.g. with a vertical brake disk axis). A stop arrangement acting on both sides in this way allows for any installation position of such a lever brake and also ensures a centered, contact-free position of the brake pads relative to one another in the releasing position.

In one embodiment, the stop elements are made of a curable material and/or have a control curve region which is surface treated to withstand the occurring loads (surface pressures) with little wear. It is thus possible, on the one hand, to extend the exchange intervals for the stop elements by reducing the wear and, on the other hand, to increase the centering accuracy since even in the permanent operation the contour courses of the control curves remain largely constant and wear-related inaccuracies are reduced.

A brake assembly having such a stop arrangement according to the invention is self-centering even in the releasing position without complicated additional movable adjusting elements, irrespective of the position of the brake lever elements relative to one another.

DESCRIPTION OF EMBODIMENTS

Design and function of the stop arrangement according to the invention and/or a brake lever arrangement having such a stop arrangement are explained below by means of FIGS. 1 to 4.

FIG. 1 shows an industrial brake 1 where the brake spring arrangement 3 and the releasing device 4 (cf. FIG. 4) are omitted for a better understanding of the stop arrangement 2.

The stop arrangement 2 comprises a first brake lever arrangement and a second brake lever arrangement 5, 6, which together form a brake lever pair in a typical brake caliper arrangement 7. For this purpose, the first brake lever arrangement and second brake lever arrangement 5, 6 are respectively articulated at the first (lower) ends 8, 9 thereof on a base plate 10 forming a support via bases 12, 13 arranged thereon. The joint here forms in each case a bolt 14 penetrating the brake lever arrangements 5, 6 and the bases 12, 13.

At the second (upper) ends 15, 16 of the brake lever arrangements 5, 6 the latter are articulated via a positioning arrangement 17, which is coupled to the brake lever arrangements 5, 6 via pivot pins 18, 19. The positioning arrangement 17 comprises an angle lever arrangement 20, which is mounted on the pivot bolt 18 in articulated fashion. It comprises a control leg 21 extending transversely to the brake lever arrangements 5, 6 and a short positioning leg 22 which protrudes therefrom and extends approximately parallel to the brake lever arrangement 5.

An adjusting rod 24, the length of which is adjustable along the axis 25 thereof via a threaded spindle arrangement 26, extends between the articulation point 23 in the control leg 21 and the pivot bolt 19.

Each brake lever arrangement 5, 6 carries a brake element 27, which is made of a brake pad 28 and a brake pad support 29, between the first (lower) end 8, 9 thereof and the second (upper) end 15, 16 thereof. A brake body formed as a brake disk 31 in this embodiment extends between the brake surfaces 30 of the brake pads 28, said brake surfaces facing each other. The brake pad supports 29 are respectively attached in articulated fashion to the first brake lever arrangement and the second brake lever arrangement 5, 6 via support bolts 32. Each of the support bolts 32 protrudes from the brake lever arrangement 5, 6 by means of one end and penetrates a first stop element 33 and a second stop element 34.

The first stop element 33 is made as a multi-leg lever which comprises a holding leg 35 that at the upper end thereof is penetrated by the support bolt 32 and at the lower end thereof by the bolt 14 so as to be non-rotatably mounted on the first brake lever arrangement 5, such that it follows every swiveling movement of the first brake lever arrangement 5. In addition, it has a control leg 36 which extends approximately transversely to the holding leg from where it extends into the region of the second brake lever arrangement 6. The control leg 36 has a control curve contour 37.

In this embodiment, the second stop element 34 is formed as a circular disk which is disposed on the support bolt 32, in particular also in rotatable fashion, and the cylindrical peripheral surface 38 of which likewise forms a control curve contour which optionally meshes with the control curve contour 37. The first and second stop elements 33, 34 are optionally made from a curable material and also optionally have, in the region of the respective control curve contour 38, 37, a coating which improves the sliding and/or wear properties in this region.

Figure 2:
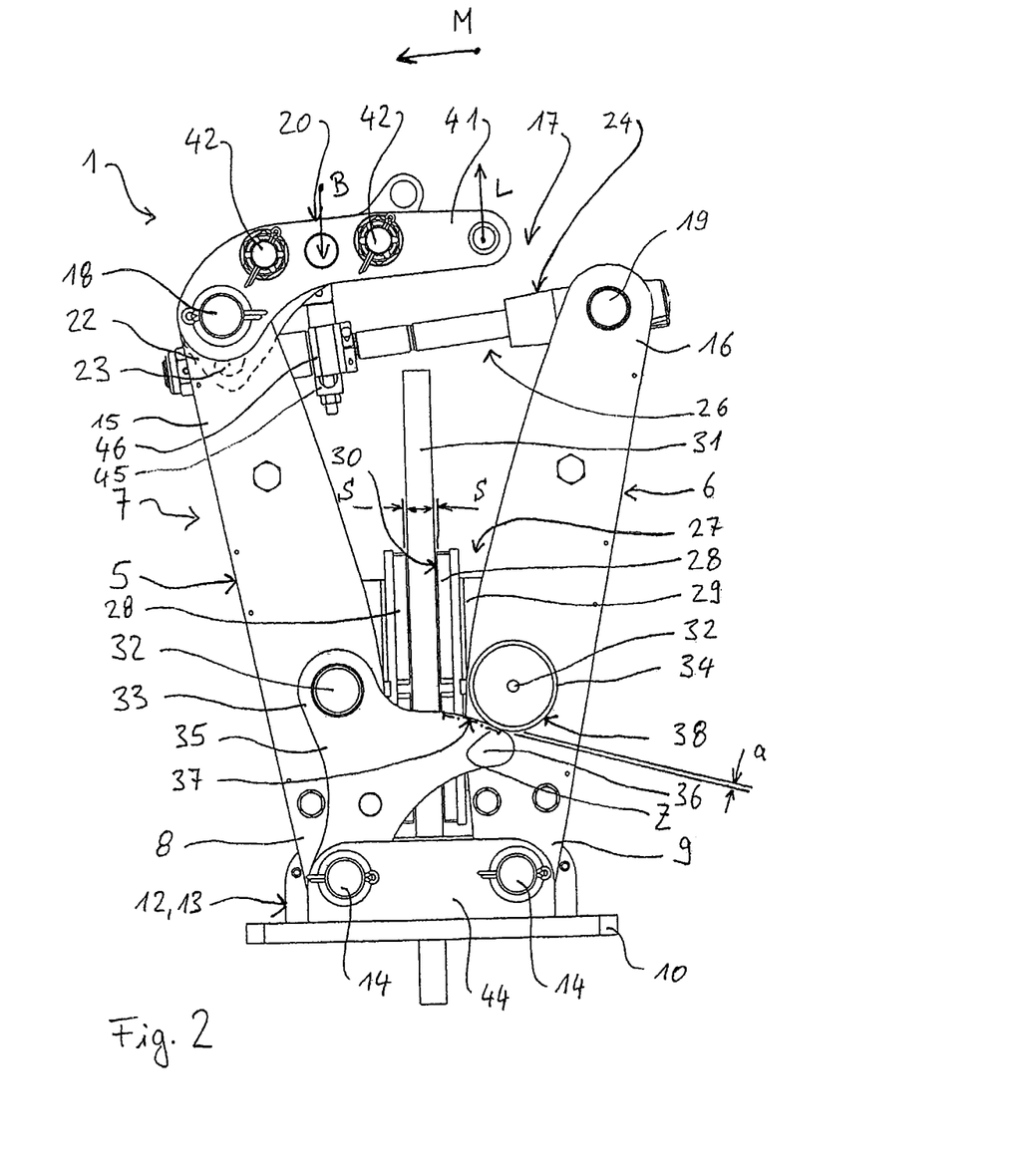
FIG. 2 shows a front view of the brake assembly illustrated in FIG. 1 in a released position and with fresh brake pads.
Figure 3:
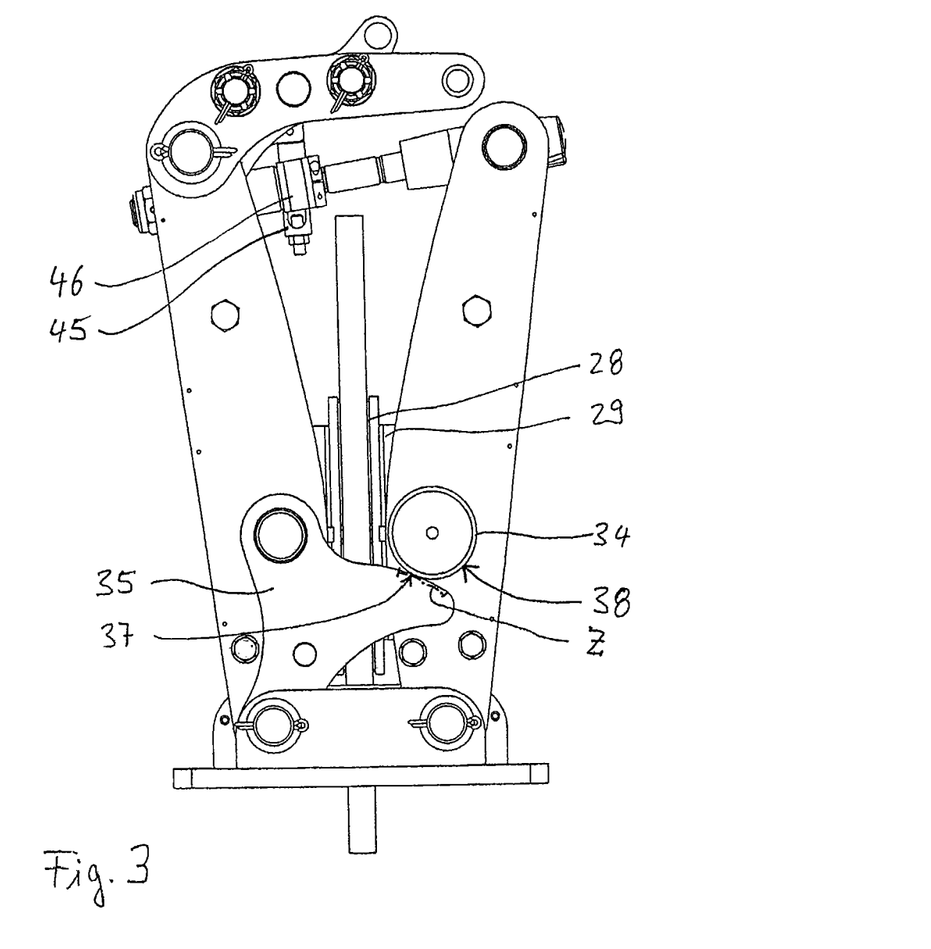
FIG. 3 shows a front view of the brake assembly illustrated in FIG. 1 in a closed position and with worn-out brake pads.
Figure 4:
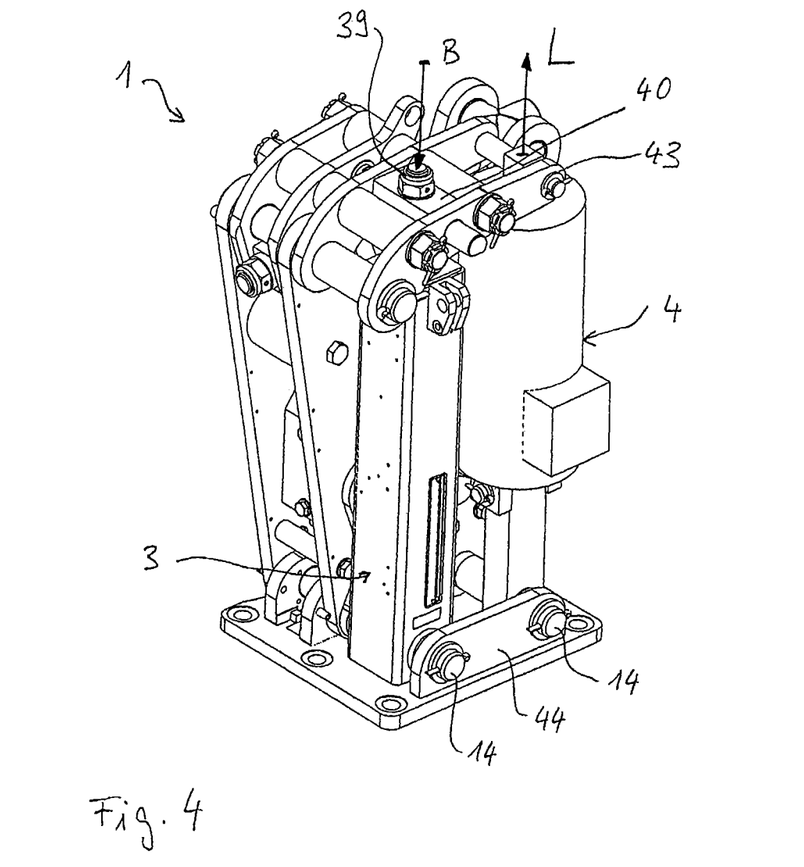
FIG. 4 shows a perspective view of the brake assembly illustrated in FIG. 1 with releasing device and brake spring arrangement.

The braking function is described by means of FIGS. 1, 2 and 3, each showing a view of the industrial brake 1 and omitting the releasing device 4 and the brake spring arrangement 3. In order to brake (close) the brake 1, the brake spring arrangement 3 exerts via the spindle 39 thereof and the cross piece 40 an adjusting force B on the control lever 41, which is coupled to the control leg 21 of the angle lever arrangement 20 via the cross bolts 42, which leg thus performs a swiveling movement about the pivot bolt 18, in so doing engages the adjusting rod 24 via the articulation point 23 and acts on the second brake lever arrangement 6 via the adjusting rod in the pivot bolt 19, as a result of which the two brake lever arrangements 5 and 6 move towards each other in a caliper movement. In this connection, the brake elements 27 are brought together, and therefore they abut against the brake disk 31 where they have a braking effect inhibiting the rotation thereof via the resulting frictional force.

In order to release the brake, the releasing device 4 exerts a force L on the end 43 of the control lever 41 and pivots the latter against the positional force B in the other direction, as a result of which the ends 8, 9 of the first and second brake lever arrangements are forced apart in caliper-like fashion via the coupled angle lever arrangement 20 and the adjusting rod 24 so as to release the brake elements 27 from the brake disk 31.

Since both the releasing device 4 and the brake spring arrangement 3 are in each case only suitable to transfer axial forces, they are coupled in articulated fashion at the ends thereof by means of the control lever 41 or via the bolts 14 to the base plate 10 via an additional base 44. As a result of the asymmetric articulation of the control lever 41 via the releasing device 4 at end 43, the spreading force which is transferred via the adjusting rod 24 and a tilting moment M are created which would displace the two brake lever arrangements 5 and 6 in the same direction. In this connection, one of the brake surfaces 30 would then abut against the brake disk 31 even if the brake pads 28 are released and would wear in the case of a rotating brake disk 31 and/or would wear the brake disk 31.

This effect is prevented by the engaging control curve contours 37 and 38 of the two stop elements 33 and 34 (see FIGS. 1, 2 and 3). In this connection, the control curve contour 37 is formed in such a way that in the case of a positional effect of equal sense in the direction M on the first and second brake lever arrangements 5 and 6 it supports the control curve contour 38 from the second stop element 34 (here a cylinder surface), thus preventing the first brake lever arrangement 5 from being able to move further in the direction M. Due to the simultaneous coupling of the second brake lever arrangement 6 via the adjusting rod 24, this also serves for preventing a further movement of the second brake lever arrangement 6 and/or the brake element 27 suspended thereon in the direction of the brake disk. Therefore, both brake lever arrangements 5 and 6 are retained in a centered position (centering position) with respect to the brake disk (FIG. 2). The releasing gap S continues to exist on both sides between the brake disk 31 and the brake pads 28 and/or the brake surfaces 30 thereof.

The control curve contour 37 is here made in such a way that, during the caliper-like braking movement of the two brake lever arrangements 5 and 6 towards each other, it is not an impediment when the brake is closed but the control curve contours 38 and 37 slide on each other or, in the case that the second stop element 34 is made as a rotary disk, roll off each other. In an optional embodiment, a clearance a matched with respect to the releasing gap S is provided between the control curve contours 37, 38. The clearance a is here determined in such a way that although in the centering position the control curve contours 38, 37 abut against one another, a reduced releasing gap S is left on one side without one of the brake pads 28 abutting on the brake disk 31 via the brake surface 30 thereof.

During a prolonged operation of the brake, both the brake pads 28 and the brake disk 31 wear off and become thinner (FIG. 3). In order to obtain a brake characteristic which is as constant as possible, this wear is compensated for by adjusting the threaded spindle arrangement 26 by screwing the adjusting rod 24 into the threaded sleeve 26A. This can either be done regularly and manually or via a readjusting mechanism which engages a free run 46 coupled to the adjusting rod 24 via a control slot 45 and rotates the adjusting rod 24 via this free run with increasing wear of the brake pads 28 or the brake disks 31, as a result of which the effective length is shortened appropriately between the articulation point 23 and the pivot bolt 19. As a result, the actual braking distance which has to be overcome to bridge the releasing gap s between brake pads 29 and brake disk 31 remains largely constant.

The control curve contours 37 and 38 are synchronized in such a way that they do not hinder this positioning compensation. In the case of a cylindrical or circular control curve contour 38, this is achieved via an e.g. involute-shaped, curved control curve contour 37, along which a centering position range Z (dot-dashed zone) extends. The radius of the circular control curve contour 38 for the curvature radius course of the control curve contour 37 here has a ratio of about one to two. The stop elements 33 and 34 are formed as a flat control disk or stop roller which can be added without major effort to existing industrial brakes by using already available elements, such as support bolts 32 and bolts 14.

Figure 5:
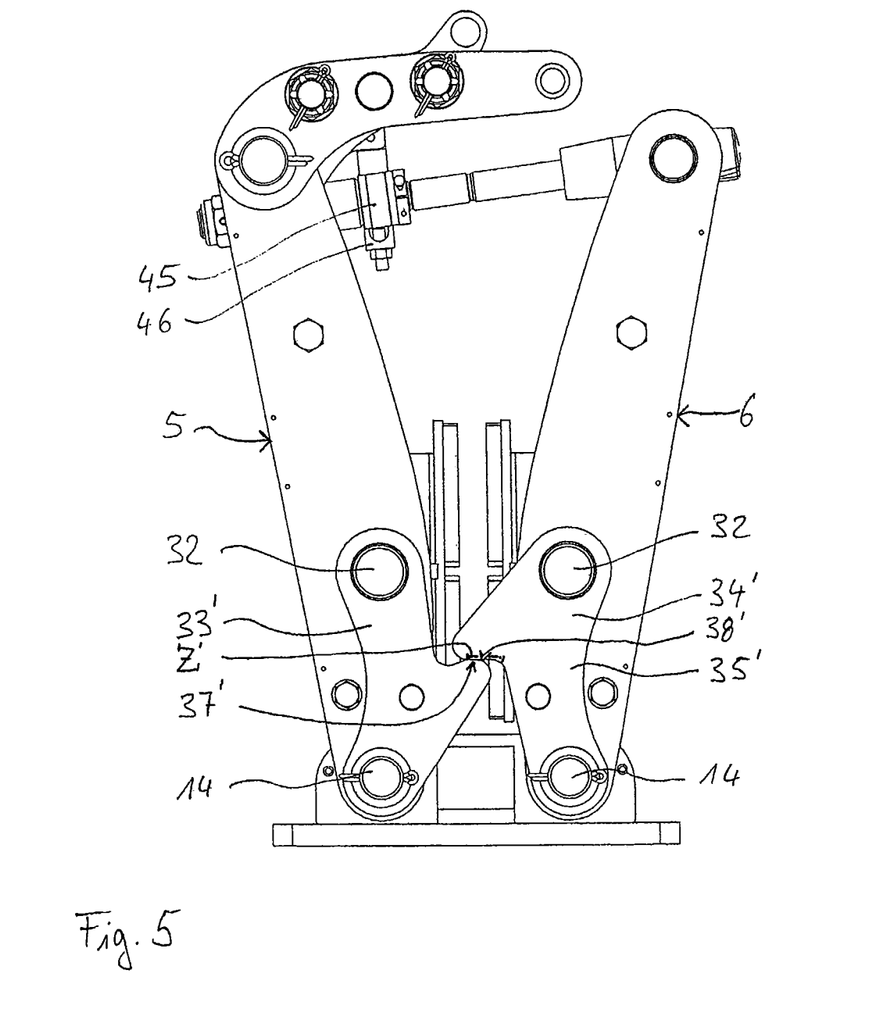
FIG. 5 shows a front view of the brake assembly illustrated in FIG. 1 with an alternative stop device.

FIG. 5 shows an exemplary embodiment having alternative stop elements 33' and 34', wherein the first stop element 33' is formed in the shape of a hook and the second stop element 34' is also coupled via a holding leg 35' at two points in rotationally fixed fashion to the second brake lever arrangement 6 and has a lug-shaped control leg 36' which has a control curve contour 38' that meshes with the control curve contour 37'. In this embodiment, the control curve contour 37' is curved more than the control curve contour 38'. The ratio of the radii of curvature of the control curve contour 37' and the control curve contour 38' is about 1:1 to 1:3. The centering position range Z extends along the control curve contour 38' on the lower side of the lug. A clearance a is also provided here optionally. In this embodiment, the centering forces transferred to the respective brake lever arrangements 5 and 6 are distributed in approximately symmetric fashion and over a total of four articulation points on the bolts 14 and 32, as a result of which the loads on these points can be reduced and the brake lever arrangements 5, 6 are largely stressed symmetrically.

In another exemplary embodiment, appropriate stop elements 33 and 34 are provided on each brake lever arrangement 5, 6, namely in cross-wise opposing fashion, as a result of which a first stop element 33 and a second stop element 34 are arranged on the first brake lever arrangement 5 and a second stop element 34 and a first stop element 33 are respectively arranged on the second brake lever arrangement 6 in an appropriately opposing fashion, which mesh with the respective ones on the first brake lever arrangement 5 in known manner. In such an arrangement, the centering of the entire brake caliper arrangement 7 is ensured in both directions. Such an industrial brake can be used in any positions, i.e. also with a horizontally extending brake disk, without internal forces, which are exerted via the releasing device 4 or the brake spring arrangement 3, and external forces (gravitational forces), which act on the brake lever arrangement 5 and 6, tilting the brake lever arrangements 5 and 6 in their entirety.

Further embodiments and variants of the invention follow on the basis of the claims.

LIST OF REFERENCE SIGNS 1 industrial brake
2 stop arrangement
3 brake spring
4 releasing device
5 first brake lever arrangement
6 second brake lever arrangement
7 brake caliper arrangement
8 first (lower) end
9 first (lower) end
10 base plate (support)
12 base
13 base
14 bolt
15 second (upper) end
16 second (upper) end
17 positioning arrangement
18 pivot bolt
19 pivot bolt
20 angle lever arrangement
21 control leg
22 adjusting leg
23 articulation point
24 adjusting rod
25 axis
26 threaded spindle arrangement
27 brake element
28 brake pad
29 brake pad support
30 brake surface
31 brake disk
32 support bolt
33 first stop element
34 second stop element
35 holding leg
36 control leg
37 control curve contour
38 control curve contour
39 spindle
40 cross piece
B closing force
L releasing force
M moment/tilting direction
41 control lever
42 cross bolt
43 end
44 additional base
45 control slot
46 free run

The invention claimed is:

1. A stop arrangement comprising:
   (a) a brake lever pair of a brake caliper arrangement comprising a first brake lever arrangement and a second brake lever arrangement;
   (b) a support, wherein a first end of the first brake lever arrangement and a first end of the second brake lever arrangement are respectively articulated on the support;
   (c) a positioning arrangement, wherein a second end of the first brake lever arrangement is coupled to a second end of the second brake lever arrangement by the positioning arrangement;
   (d) a first stop element arranged between the first and second ends of the first brake lever arrangement, wherein the first stop element is non-rotatably mounted on the first brake lever arrangement; and
   (e) a second stop element arranged between the first and second ends of the second brake lever arrangement;
   wherein the first and second stop elements are formed to mesh in such a way to allow operating movements of the first brake lever arrangement and the second brake lever arrangement articulating in opposite direction towards and away from one another between a brake position and a releasing position of the first and second brake lever arrangements and to inhibit an aligned tilting movement of the first and second brake lever arrangements in a tilting direction, to retain the first and second brake lever arrangements in the releasing position against a tilting action in a centering position within a defined centering position range with respect to a brake element.

2. The stop arrangement according to claim 1, wherein the centering position range comprises a first limit position and a second wear-related limit position, which the first and second brake lever arrangements adopt in the releasing position, wherein the first and second brake lever arrangements are further apart from each other in the first limit position than when the first and second brake lever arrangements are in the second limit position.

3. The stop arrangement according to claim 1, wherein the first stop element comprises a first control curve contour and the second stop element comprises a second control curve contour, wherein the first control curve contour and the second control curve contour are configured to abut against each other in the centering position within the defined centering position range.

4. The stop arrangement according to claim 3, wherein the first control curve contour of the first stop element comprises a first curvature course and the second control curve contour of the second stop element comprises a second curvature course, wherein a ratio of the first curvature course radius to the second curvature course radius is from about 3:1 to about 1:1.

5. The stop arrangement according to claim 4, wherein the ratio of the first curvature course radius to the second curvature course radius is about two to one.

6. The stop arrangement according to claim 1, wherein the first stop element is a control cam and the second stop element is a stop roller.

7. The stop arrangement according to claim 6, wherein the control cam comprises a holding leg that comprises a lower end and an upper end, wherein the lower end is fixed in a first articulation point and the upper end is fixed in a reception point of a brake pad support between the first and second ends of either of the first or the second brake lever arrangements.

8. The stop arrangement according to claim 6 wherein the stop roller is fixed in a reception point of a brake pad support between the first and second ends of the first and second brake lever arrangements.

9. The stop arrangement according to claim 1, wherein the first and second stop elements are arranged on each of the first and second brake lever arrangements to inhibit the aligned tilting of the first and second brake lever arrangements in the tilting directions.

10. The stop arrangement according to claim 1, wherein at least one of the first and second stop elements are made of a curable material.

11. The stop arrangement according to claim 3, wherein at least one of the first and second stop elements are respectively coated in a region of the first control curve and/or in a region of the second control curve with a coating that improves sliding and/or wear properties.

12. A brake assembly comprising a stop arrangement, wherein the stop arrangement comprises:
   (a) a first brake lever arrangement;
   (b) a second brake lever arrangement;
   (c) a support, wherein a first end of the first brake lever arrangement and a first end of the second brake lever arrangement are respectively articulated on the support;
   (d) a positioning arrangement, wherein a second end of the first brake lever arrangement is coupled to a second end of the second brake lever arrangement by the positioning arrangement;
   (e) a first stop element arranged between the first and second ends of the first brake lever arrangement, wherein the first stop element is non-rotatably mounted on the first brake lever arrangement; and
   a second stop element arranged between the first and second ends of the second brake lever arrangement;
   wherein the first and second stop elements are formed to mesh in such a way to allow operating movements of the first brake lever arrangement and the second brake lever arrangement articulating in opposite direction towards and away from one another between a brake position and a releasing position of the first and second brake lever arrangements and to inhibit an aligned tilting movement of the first and second brake lever arrangements in a tilting direction, to retain the first and second brake lever arrangements in the releasing position against a tilting action in a centering position within a defined centering position range with respect to a brake element.

13. The brake assembly according to claim 12, wherein the centering position range comprises a first limit position and a second wear-related limit position, which the first and second brake lever arrangements adopt in the releasing position, wherein the first and second brake lever arrangements are further apart from each other in the first limit position than when the first and second brake lever arrangements are in the second limit position.

14. The brake assembly according to claim 12, wherein the first stop element comprises a first control curve contour and the second stop element comprises a second control curve contour, wherein the first control curve contour and the second control curve contour are configured to abut against each other in the centering position within the defined centering position range.

15. The brake assembly according to claim 14, wherein the control curve contour of the first stop element comprises a first curvature course and the control curve contour of the second stop element comprises a second curvature course, wherein a ratio of the first curvature course radius to the second curvature course radius is from about 3:1 to about 1:1.

16. The brake assembly according to claim 12, wherein the first stop element is a control cam and the second stop element is a stop roller.

17. The brake assembly according to claim 16, wherein the control cam comprises a holding leg that comprises a lower end and an upper end, wherein the lower end is fixed in a first articulation point and the upper end is fixed in a reception point of a brake pad support between the first and second ends of either of the first or the second brake lever arrangements.

18. The brake assembly according to claim 16, wherein the stop roller is fixed in a reception point of a brake pad support between the first and second ends of the first and second brake lever arrangements.

19. The brake assembly according to claim 12, wherein the first and second stop elements are arranged on each of the first and second brake lever arrangements to inhibit the aligned tilting of the first and second brake lever arrangements in the tilting directions.

20. A brake assembly comprising:
    (f) a brake spring arrangement;
    (g) a releasing device; and
    (h) a stop arrangement, wherein the stop arrangement comprises:
        (i) a first brake lever arrangement,
        (ii) a second brake lever arrangement,
        (iii) a support, wherein a first end of the first brake lever arrangement and a first end of the second brake lever arrangement are respectively articulated on the support,
        (iv) a positioning arrangement, wherein a second end of the first brake lever arrangement is coupled to a second end of the second brake lever arrangement by the positioning arrangement,
        (v) a first stop element arranged between the first and second ends of the first brake lever arrangement, wherein the first stop element is non-rotatably mounted on the first brake lever arrangement; and
        (vi) a second stop element arranged between the first and second ends of the second brake lever arrangement;

wherein the first and second stop elements are formed to mesh in such a way to allow operating movements of the first brake lever arrangement and the second brake lever arrangement articulating in opposite direction towards and away from one another between a brake position and a releasing position of the first and second brake lever arrangements and to inhibit an aligned tilting movement of the first and second brake lever arrangements in a tilting direction, to retain the first and second brake lever arrangements in the releasing position against a tilting action in a centering position within a defined centering position range with respect to a brake element.

* * * * *